Patented Feb. 19, 1929.

1,702,765

UNITED STATES PATENT OFFICE.

HENRY L. COLES AND JOSEPH G. DONALDSON, OF HAMILTON, OHIO, ASSIGNORS TO GUARDIAN METALS COMPANY, OF HAMILTON, OHIO, A CORPORATION OF DELAWARE.

METALLIC ALLOY AND PROCESS OF FORMING THE SAME.

No Drawing.   Application filed June 13, 1922. Serial No. 568,006.

The object of our invention is to produce a metallic alloy which shall be capable of resisting melting or oxidation, as by the local application of high heat by means of the blow pipe or other device, also which shall be capable of resisting disruption by explosives and cutting by drills or other tools.

In carrying out our invention we employ, primarily, what we shall term herein a "major high melting point metal", meaning by this term that the principal constituent of the alloy consists of a metal or combination of metals having a melting point above 2200° C. Illustrations of such a metal or metals are tungsten, molybdenum, uranium, etc. In fact it is intended to cover by the above term all metals of high melting point included within group 6 of Mendelejeff's Periodic Table, and for the purposes of this invention the major metal may consist of one of these, as, for instance, tungsten, or two, as, for instance, tungsten, molybdenum as desired. With this major metal we combine a smaller percentage (preferably from 10% to 25% of the resulting alloy) of another metal, such as nickel. It is essential that the alloy contain carbon or carbides, and these may be absorbed from the hearth or may be added in the form of the carbides of the metals employed, or may be directly added to the mixture during the melting process. Such carbon may be added in varying proportions, care being taken, however, that the metals be not saturated therewith and thus converted entirely into carbide, our purpose being to mix a metal with its metallic carbide and not to use the carbide of a metal alone. From 2% to 5% of carbon has been found to give satisfactory results.

To a metallic alloy having the constituents above stated we may, if desired, add copper in any suitable proportion preferably in the form of copper sulphide or cupro-silicon. Again, if desired, the metallic alloy, as above stated, may be used as a core, molten copper or other metal being cast about it, in which case over the areas of contact between casing and core an alloying action will take place, producing at such points material of very high melting point, practically burn-resisting and drill-resisting, and possessing an added advantage residing in the high heat conductivity of the encompassing copper.

In practicing our process the electric furnace may advantageously be employed, in which the major metal may be melted and the other constituents added after the same has become molten. We employ the oxide of one of the metals (for example, tungsten), together with the sulphide of the other metal (for example, nickel), adding preferably sufficient carbon to reduce the oxide. If desired, either the oxide or the sulphide may be present in excess in order that the reaction may be carried to completion. For the purpose of illustration, where but a single major high melting point metal is employed, the following charge may be used:—

700 lbs. tungsten concentrates (approximately 66% $WO_3$).
100 lbs. nickel sulphide.
60 lbs. calcium sulphate ($CaSO_4$).
20 lbs. calcium fluoride ($CaF_2$).

A typical charge for an alloy using two major high melting point metals is as follows:—

600 lbs. tungsten concentrates (approximately 66% $WO_3$).
400 lbs. molybdenite (approximately 85% $MoS_2$).
100 lbs. nickel sulphide (NiS).
60 lbs. calcium sulphate ($CaSO_4$).
20 lbs. calcium fluoride ($CaF_2$).

The carbon may be added directly to the charge or may be absorbed from the hearth or from the drippings of the electrodes in case carbon is desired. If added directly to the charge, it is preferable to introduce the nickel in metallic form in sufficient quantity toward the end of the reaction. Also, if desired, copper sulphide may be added during the reaction. It may also be noted that in place of the tungsten concentrates we may use scheelite.

The purpose of the calcium sulphate and the calcium fluoride is to provide a flux which will prevent the escape of the sulphur until the reaction has been completed; also to provide a fluid and volatile flux which will pass off when the temperature is raised at the end of the reaction. Such reaction, which begins to take place between 1300 and 1400° C., is as follows:—

$$2WO_3 + NiS + 4C = 4CO + SO_2 + 2W + Ni.$$

The calcium sulphate and the calcium fluoride form a fluid slag which will not only as above stated, prevent the escape of the sulphur in order that the reaction may continue, but which also will not absorb sulphur at the beginning of the reaction. As the temperature rises the calcium sulphate begins to dissociate into calcium oxide (CaO) and sulphur tri-oxide ($SO_3$). The calcium oxide together with the calcium fluoride (which acts to lower the melting point of the slag) form a basic slag which is highly effective in absorbing sulphur from the alloy when formed at the end of the reaction. Such slag possesses therefore the three advantageous qualities found desirable in the production of a proper yield of metal, as heretofore generally indicated, i. e., fluidity, non-absorptiveness of sulphur at the beginning of the reaction and capacity for volatilizing at the close of the reaction, the remaining portion forming a basic slag to assist in purifying the alloy of sulphur found therein. We may add that with slags differently constituted the metal would, on occasion, be found mixed therewith, offering difficulty in subsequent separation; also by the use of the slag herein described the maximum yield of clear metal is obtained.

As noted from the formulæ above listed, the calcium sulphate and calcium fluoride are present in substantially uniform amounts, ranging from 9% to 7% in the two examples listed. In both instances the ratio of the flux constituents to each other is substantially 75% of calcium sulphate to 25% of calcium fluoride. This composition of fluxing agents assures a relatively low melting flux which is characterized by high fluidity and ability to re-act with sulphur and hold it in a fixed condition at the relatively low temperatures obtaining at the beginning of the re-action.

Good results may be produced by a modification of the second typical charge specified above, i. e., the substitution of copper sulphide for molybdenite. Or, if desired, either retaining or omitting the molybdenite, copper may be added directly to the mixture at the end of the melt, or, as previously set forth, the alloy may be used as a core, an encasing mass of metal being cast about it, in which case further alloying will take place at the areas of contact.

A metal alloy produced as above indicated will resist melting by the application of high heat as by means of a blow torch; also cutting as by means of oxygen. If found somewhat lacking in ductility a composite mass of metal may be made up employing such an alloy as laminæ separated by other (and more ductile) metals, and preferably welded thereto or alloyed therewith. This capacity for resisting the application of high heat permits the use of the alloy in very thin strata, and such resistance is increased where the alloy is encased in another metal due to the heat-conductivity of the latter, which permits the heat from the torch to be dissipated. The encompassing metal, if used, may be steel, iron or other metals. This, when cast about a core of the alloy above described, forms a union therewith at the areas of contact, these areas becoming extremely hard and highly resistant to penetration as by means of the drill.

We claim:—

1. The process of forming a metallic alloy which consists in fusing together metallic oxide of a metal and metallic sulphide of another metal and a material adapted to react with and to prevent the escape of sulphur until the completion of their reaction and passing off thereafter.

2. The process of forming a metallic alloy which consists in fusing together metallic oxide of a metal and metallic sulphide of another metal in the presence of calcium sulphate and calcium fluoride, the combined amounts of which total substantially 7 to 9 percent of the charge.

3. The process of forming a metallic alloy which consists in fusing together a charge of metallic oxide of a metal and metallic sulphide of another metal and carbon in the presence of calcium sulphate and calcium fluoride.

4. The process of forming a metallic alloy which consists in fusing together a preponderating metallic constituent having a melting point of upwards of 2200 degrees C. and nickel, the oxide of one and the sulphide of the other in the presence of calcium sulphate and calcium fluoride.

5. An alloy comprising not more than 86% of tungsten, approximately 14% nickel, and 2 to 5 per cent carbon.

6. An alloy comprising not more than 86 percent of tungsten, 12 to 25 percent nickel, and 2 to 5 percent carbon.

This specification signed and witnessed this 8th day of June, 1922.

HENRY L. COLES.
JOSEPH G. DONALDSON.